US009074720B2

(12) United States Patent
D'Hulster (10) Patent No.: US 9,074,720 B2
(45) Date of Patent: Jul. 7, 2015

(54) APPARATUS AND METHOD FOR REPAIRING PIPES (71) Applicant: Perma-Liner Industries, LLC, Clearwater, FL (US)

(72) Inventor: Gerald D'Hulster, Clearwater, FL (US)

(73) Assignee: Perma-Liner Industries, LLC, Clearwater, FL (US)

( * ) Notice: Subject to any disclaimer, the term of this patent is extended or adjusted under 35 U.S.C. 154(b) by 0 days.

(21) Appl. No.: 13/775,732

(22) Filed: Feb. 25, 2013

(65) Prior Publication Data

US 2013/0220465 A1 Aug. 29, 2013

Related U.S. Application Data (60) Provisional application No. 61/603,360, filed on Feb. 26, 2012.

(51) Int. Cl.
*F16L 55/16* (2006.01)
*F16L 55/165* (2006.01)

(52) U.S. Cl.
CPC ................. *F16L 55/1651* (2013.01)

(58) Field of Classification Search
CPC .... F16L 55/124; F16L 55/134; F16L 55/1651
USPC .......................... 138/98, 93; 405/150.1, 184.2
See application file for complete search history.

(56) References Cited

U.S. PATENT DOCUMENTS

| 4,602,974 | A | * | 7/1986 | Wood et al. | 156/287 |
| 5,154,936 | A | * | 10/1992 | Driver et al. | 425/182 |
| 6,093,363 | A | * | 7/2000 | Polivka | 264/516 |
| 6,361,015 | B1 | * | 3/2002 | Warmerdam | 251/5 |
| 6,695,013 | B2 | * | 2/2004 | Warren | 138/98 |
| 6,827,526 | B2 | * | 12/2004 | Warren | 405/184.2 |
| 7,766,048 | B2 | * | 8/2010 | Driver et al. | 138/98 |
| RE43,910 | E | * | 1/2013 | Waring | 264/36.17 |
| 8,439,605 | B2 | * | 5/2013 | Odell et al. | 405/184.2 |

(Continued)

FOREIGN PATENT DOCUMENTS

| GB | 989847 | 4/1965 |
| WO | WO 2012/016244 A2 | 2/2012 |

OTHER PUBLICATIONS

Perma-Liner Industries, LLC, PCT/US2013/027791 filed Feb. 26, 2013, "The International Search Report and the Written Opinion of the International Searching Authority, or the Declaration", mailed May 2, 2013.

*Primary Examiner* — James Hook
(74) *Attorney, Agent, or Firm* — Ryan N. Carter (57) ABSTRACT An apparatus and method that accelerates curing of resin in a liner for a buried pipe includes an air inversion unit connected to an air compressor. The apparatus includes an inversion head with an interior inflatable plug. The plug, when inflated, creates a substantially airtight seal thereby maintaining pressure within the liner tube. The inversion head can then be removed from the liner inversion apparatus and a curing cap can be installed. To improve the wetting process, a vacuum head is installed at the inversion head and connected to a vacuum source. One end of the liner tube is attached to the inversion head and curable resin is poured into the opposite end. Vacuum pressure is applied to assist in the movement of the resin through the liner tube, ensuring uniform saturation. The resin is mechanically manipulated through the liner tube as the vacuum pressure is applied.

22 Claims, 6 Drawing Sheets

(56) References Cited

U.S. PATENT DOCUMENTS

| | | |
|---|---|---|
| 2008/0047624 A1 | 2/2008 | Iwasaki-Higbee |
| 2010/0154187 A1* | 6/2010 | Kamiyama et al. ........ 29/402.16 |
| 2010/0243091 A1 | 9/2010 | D'Hulster |
| 2012/0060957 A1* | 3/2012 | D'Hulster et al. .............. 138/98 |

* cited by examiner

APPARATUS AND METHOD FOR REPAIRING PIPES

CROSS-REFERENCE TO RELATED APPLICATIONS

This application claims priority under 35 U.S.C. §119 to provisional application Ser. No. 61/603,360, filed Feb. 26, 2012, which is herein incorporated by reference in its entirety.

FIELD OF THE INVENTION

The present invention relates generally to liners that are used to repair buried pipes without excavation. More particularly, but not exclusively, it relates to an apparatus and method that reduces the amount of time required to complete such repairs.

BACKGROUND OF THE INVENTION

Methods of rehabilitating damaged pipes by inverting a tubular liner impregnated with curable resin are known. The known methods of installing a liner to repair a buried pipe, while it remains underground, involve inserting a liner into the pipe and forcing the liner into engagement with the inner walls of the pipe by inflating a bladder. The liner is impregnated with curable resins prior to insertion and the bladder must remain inflated until the resin cures. The time required for the resin to cure, however, ranges from three to eight hours, depending upon ambient temperatures.

Thus, there is a need in the art for an apparatus and method that provides a shorter curing time regardless of ambient temperatures.

SUMMARY OF THE INVENTION

It is therefore a primary object, feature, and/or advantage of the present invention to provide a method and system for identifying a product.

It is another object, feature, and/or advantage of the present invention to provide an inversion head that can be attached to vacuums, fluid sources, and curing heads quickly and easily to repair a damaged section of pipe.

It is yet another object, feature, and/or advantage of the present invention to provide an inflatable plug connected to an inversion head to plug an inflated liner to allow a different attachment to be attached to the inversion head.

It is still another object, feature, and/or advantage of the present invention to provide a vacuum source attached to the inversion head to aid in impregnating a liner with a material capable of curing and hardening.

These and/or other objects, features, and advantages of the present invention will be apparent to those skilled in the art. The present invention is not to be limited to or by these objects, features and advantages. No single embodiment need provide each and every object, feature, or advantage.

The long-standing but heretofore unfulfilled need for an apparatus and method that shortens resin-curing times is now met by a new, useful, and non-obvious invention. The apparatus includes an inversion head with an interior inflatable bladder. The bladder, when inflated, creates a substantially airtight seal thereby maintaining pressure within the liner tube. The inversion head can then be removed from the liner inversion apparatus and a curing cap can be installed.

To improve the "wetting process," a vacuum head is installed in the inversion head and connected to a vacuum source. One end of the liner tube is attached to the inversion head and curable resin is poured into the opposite end. Vacuum pressure is applied to assist in the movement of the resin through the liner tube ensuring uniform saturation. The resin is preferable mechanically manipulated through the liner tube as the vacuum pressure is applied.

According to an aspect of the invention, a method of repairing a damaged section of a pipe is provided. The method includes providing a liner having an open first end and a substantially closed second end, impregnating the liner with a material capable of curing and hardening, and inverting the liner into the pipe with an inversion head. The first end of the liner is attached to a portion of the inversion head. The method also includes inflating the liner to press the liner against the wall of the pipe, inflating a plug at least partially within the inversion head to substantially close the open end of the liner at the inversion head, and allowing the material to cure and harden.

According to another aspect of the invention, an assembly for repairing a damaged section of a pipe is provided. The assembly includes an inversion head having an intake end and an opposite discharge end, and a liner having an open first end and a substantially closed second end, the first end attached to the discharge end of the inversion head. The intake end of the inversion head is configured to removably attach to an inversion member for inflating the liner, and a curing head for curing a material capable of curing and hardening that is impregnated in the liner.

According to yet another aspect of the invention, a method of repairing a damaged section of a pipe is provided. The method includes providing a liner having an open first end and a substantially closed second end, attaching the open end of the liner to a discharge end of an inversion head, impregnating the liner with a material capable of curing and hardening by applying vacuum pressure at an intake end of the inversion head, inverting the liner into the pipe by a fluid source attached to the intake end of the inversion head, inflating the liner to press the liner against the wall of the pipe, inflating a plug at least partially within the inversion head to substantially close the open end of the liner at the inversion head, and allowing the material to cure and harden.

BRIEF DESCRIPTION OF THE DRAWINGS

FIG. 4A is a side plan view of an illustrative curing cap installed in an inversion head with the flexible tube extending there through.

DETAILED DESCRIPTION OF THE PREFERRED EMBODIMENTS

Figure 1:
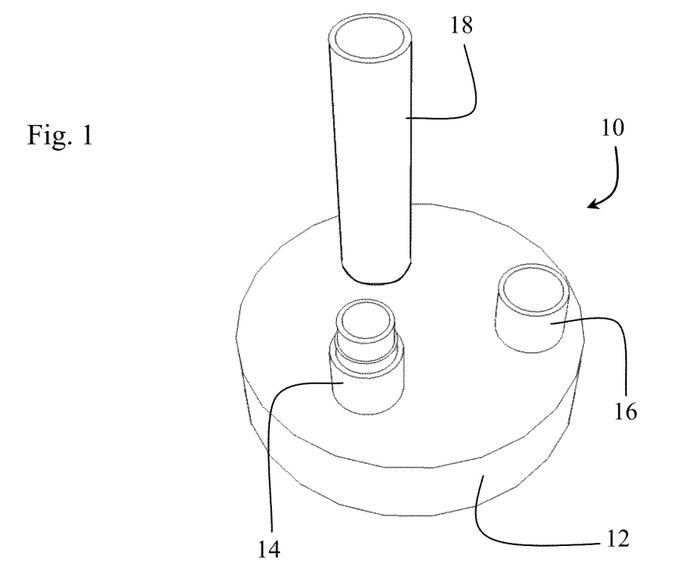
FIG. 1 is a perspective view of an illustrative curing cap.
Figure 2:
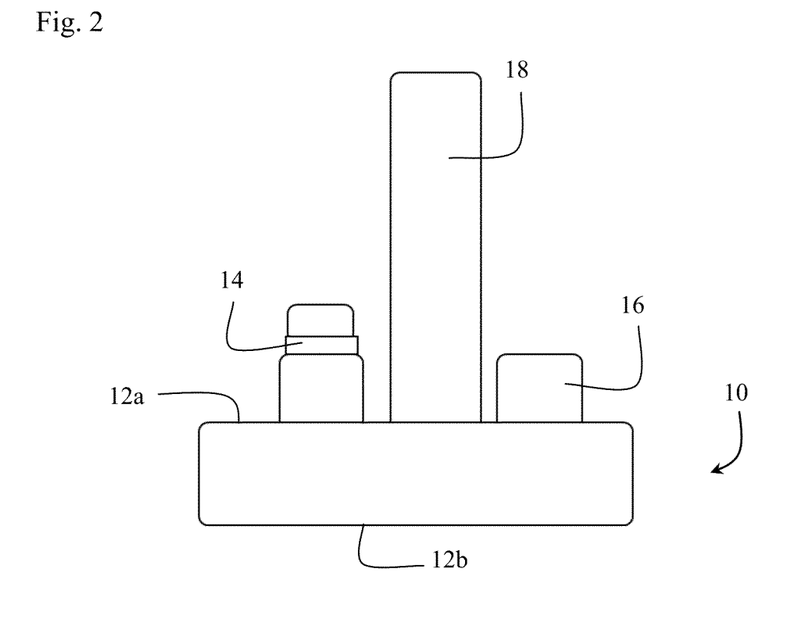
FIG. 2 is a side plan view of an illustrative curing cap.
Figure 3A:
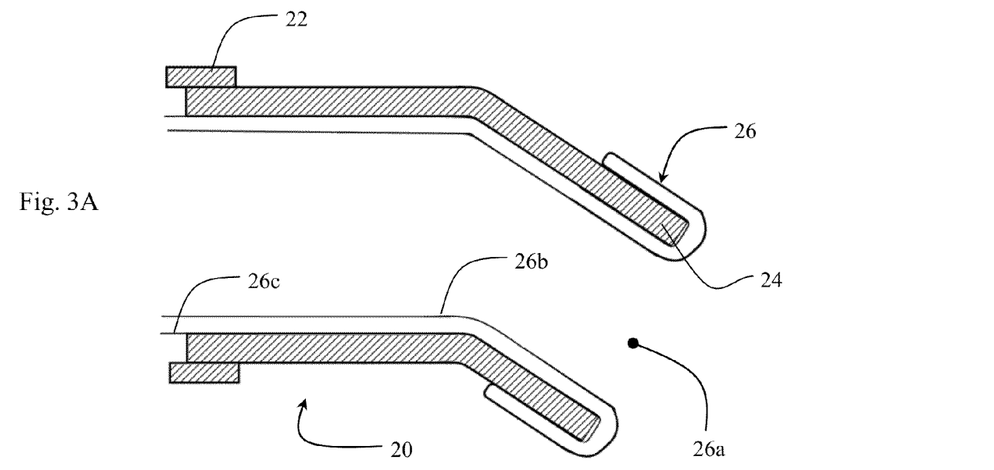
FIG. 3A is a side plan view of an inversion head, with an un-inverted tubular liner positioned thereon.

While the present invention is shown for use with sewer pipeline repair, it should be appreciated that the invention can be utilized for repairing other types of pipes, ducts, tunnels and shafts, such as gas, water, oil, steam and compressed air conduits. FIGS. 1 and 2 depict an illustrative embodiment of a curing cap or head, which is denoted as a whole by the reference numeral 10. The curing cap 10 includes a substantially circular body 12 having an outer side 12a and an inner side 12b. The outer side 12a further includes an inflation port 14, a curing port 16, and a discharge port 18. All ports are preferably arranged to provide unidirectional fluid communication between the outer side 12a and the inner side 12b of the circular body 12. The inner side 12b of the circular body 12 is received by an intake 22 of inversion head 20 (FIG. 3A). The discharge end 24 releasably engages the interior of the open end 26a of the liner tube 26.

Two types of liner tubes are commonly used. The first type of liner comprises a felt or fiberglass lining, having a substantially closed end and an opposite open end, and being impregnated with a curable resin. The second type includes a lining composition of two (2) main layers; a first layer comprising an inflatable bladder having a substantially closed end and an opposite open end, and a second layer of felt or fiberglass lining that is impregnated with a curable resin.

The liner tube 26 preferably comprises a resin-absorbent layer, such as a felt layer (26b), as well as a resin impervious layer (26c). The resin impervious layer may comprise a rubber, elastomer, or plastic, as is known in the art. The felt layer is adapted to absorb a resin or grout material, and the plastic layer is adapted to provide an impervious, smooth, and continuous surface. Prior to inverting the liner tube, the plastic layer is located on the outside of the liner tube and the felt layer is located on the inside. During the inversion process (described below), the liner tube 26 is inverted such that the felt layer is on the outside of the liner tube and the smooth plastic layer is on the inside of the liner tube. Use of an impermeable coating on the liner tube allows the liner tube to be inflated and inverted without the use of a separate bladder. However, the invention also contemplates that a bladder can be used, which can negate the need for the impervious layer of the liner. In embodiments using an inflatable bladder, the bladder overlies the felt lining and can contact with plastic layer 26c. After inversion, the bladder will be generally within the liner, with the felt layer of the liner against the wall of the pipe.

Prior to inversion, the intake 22 of the inversion head 20 is connected (via a tubular conduit) to a liner dispensing unit (which normally include a source of pressurized air or other fluid). The dispensing unit holds a length of resin soaked liner prior to delivery. During inversion, the air or other fluid under pressure flows through the system from the dispensing unit towards inversion head 20.

Figure 3B:
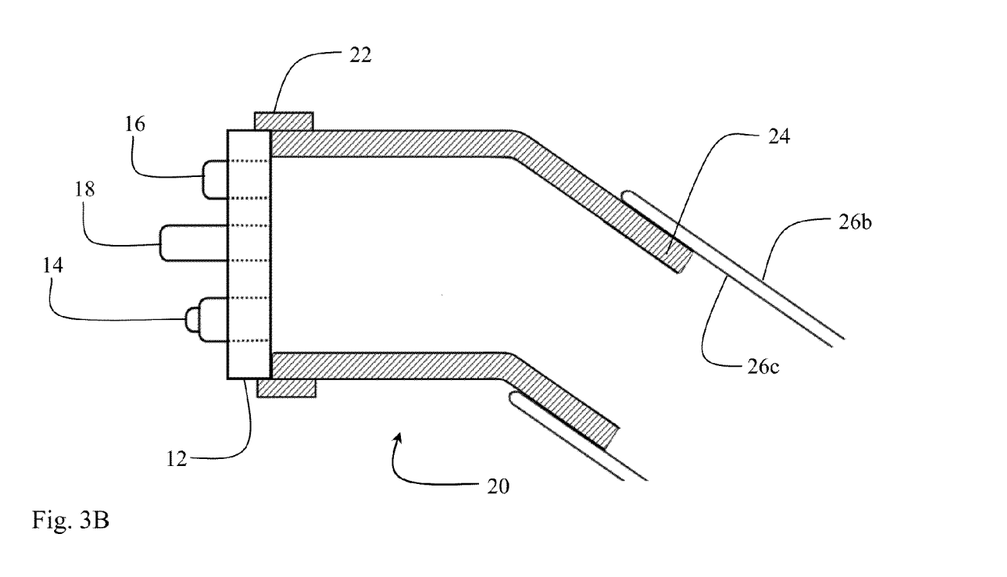
FIG. 3B is a side plan view of an illustrative curing cap installed in an inversion head, which is in turn installed in the open end of an liner tube.

As shown in FIG. 3A, the open end 26a of the liner tube 26 is fitted over the discharge end 24 of the inversion head 20 and is secured in place to create an airtight connection therearound, ensuring the air under pressure causes the closed leading end of the liner tube 26 (not shown) to follow a path of travel through the curing cap 20 into the interior or lumen of the pipe, thereby inverting said liner as said closed end is propelled to the distal end of the pipe by said fluid under pressure (see FIG. 3B).

Accordingly, the liner tube 26 is fully inverted along its entire extent when the closed end of the liner tube 26 reaches the distal end of the pipe. The impervious layer now forms the interior surface of liner tube 26 and the resin-impregnated outer layer now forms the exterior layer, which is pressed against the inner sidewalls of the pipe by the pressure of said gaseous or liquid fluid.

Fluid, such as air or steam, from the inversion compressor further causes the liner 26 (or bladder/liner combination) to expand radially so that the resin-impregnated portion of the liner 26 comes into contact with the interior of the pipe to be repaired. Air pressure is continued against the interior of the liner (or inflatable bladder) to force the resin impregnated or coated surface of the liner 26 into contact with the interior of the pipe.

Figure 4A:
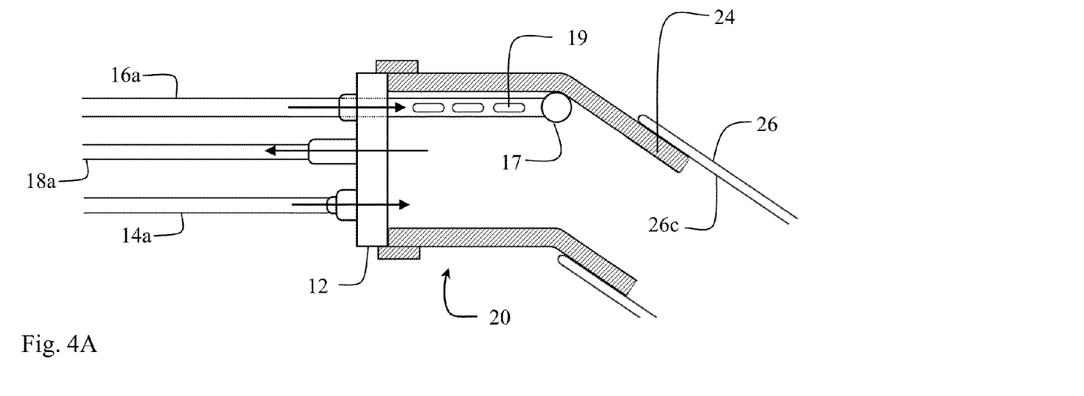
Figure 4B:
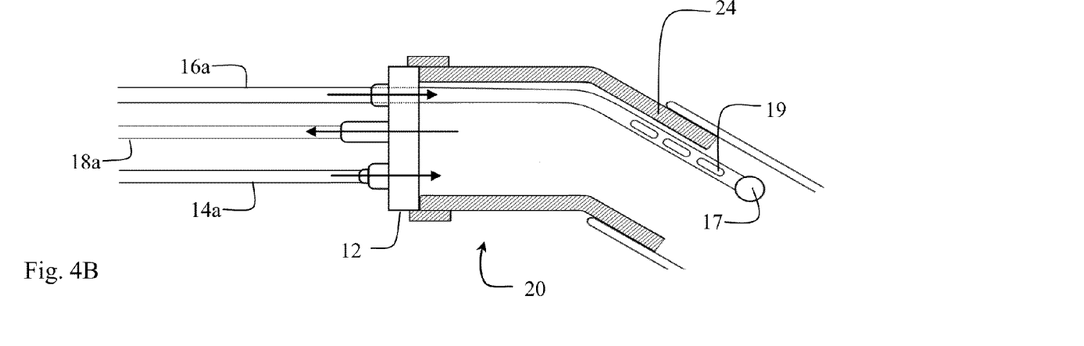
FIG. 4B is a side plan view of an illustrative curing cap installed in an inversion head with the flexible tube extending there through and into the lumen of the tubular liner.

Once the liner tube 26 is fully inverted, the inversion head 20 is uncoupled from the dispensing unit and compressed air source. Turning now to FIG. 4A, a curing cap 10 is then coupled with the intake 22 of the inversion head 20 (FIG. 3B). An inflation port 14 is connected to an air compressor (not shown) via an airline 14a. Air from the compressor maintains the pressure within the liner 26 to keep the resin impregnated portion or layer (26b) of the liner 26 in contact with the interior of the pipe.

The curing port 16 is connected, via a flexible curing tube 16a, to a manifold 30 (see FIG. 5), which is in turn in fluid communication with a heated fluid source and an air compressor (not shown). In an alternative embodiment, however, it is possible to use a single air compressor connected to the manifold to provide connections to both the inflation port 14 and the curing port 16. The curing port 16 is preferably of a slip-ring configuration, but can be adapted for any configuration that allows the curing tube 16a to slide through the curing port 16, while maintaining a substantially fluid-tight seal.

The drainage port 18 is also connected to the manifold 30 and provides fluid communication, via a drainage line 18a, from the interior of the pipe outward to the manifold 30.

Figure 5:
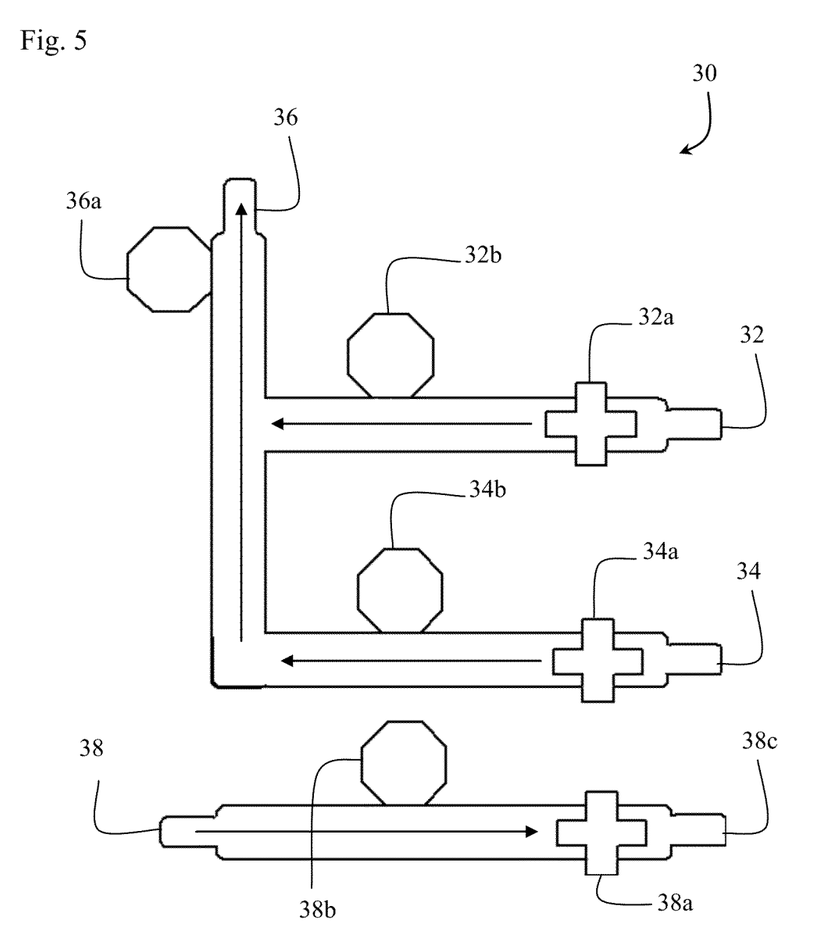
FIG. 5 is a diagrammatic view of an illustrative manifold.

The manifold 30, FIG. 5, includes a heat inlet 32, an air inlet 34, and an outlet 36. The heat inlet 32 is in fluid communication with a heating source, which provides heated fluid (i.e. hot water or steam) to the system. The flow of heated fluid into the system is controlled by a heat valve 32a, and the temperature and/or pressure of the heated fluid is monitored by a gauge 32b. The air inlet 34 is in fluid communication with a drainage air compressor, which provides air, under pressure, to the system. The flow of air under pressure into the system is controlled by an air valve 34a, and the temperature and/or pressure of the air is monitored by a gauge 34b. As previously stated, the drainage air compressor can be replaced by the inversion air compressor using linkages as known in the art. Both the heat fluid inlet 32 and the air inlet 34 are in open fluid communication with the outlet valve 36. For example, when the heat valve 32a is open, heated fluid is permitted to pass through the manifold 30, thereby exiting the outlet 36 and entering the system via the curing tube 16a.

The manifold 30 also includes a drainage inlet 38, connected to the drainage line 18, which further comprises a drainage valve 38a and a temperature/pressure gauge 38b. Fluids leaving the system via the drainage line 18a can be monitored via the gauge 38b and disposed of when safe through the drainage outlet 38c.

Another aspect of the inventive method occurs after the liner tube 26 has been inverted and is being pressed against the sides of the pipe under pressure. This aspect includes the steps of inserting a curing tube 16a into the lumen of the liner tube 26, opening the heat valve 32 so that heated fluid flows through the manifold 30 via the outlet 36, into curing the curing tube 16a, and into the lumen of the liner tube 26.

The curing tube 16a is an elongate flexible tube including a substantially spherical guide 17 at its distal end. The curing tube 16a also includes a series of perforations 19 proximal to the spherical guide 17. Once the liner tube 26 is fully extended, the curing tube 16a is fed through the curing port 16, thereby advancing the guide 17 through the lumen of the liner tube 26. The substantially spherical shape of the guide 17 allows the distal end of the tube to easily navigate corners and bends. Once properly positioned, the heated fluid passes through the curing tube 16a and out the perforations 19 into the lumen of the liner tube 26 near its distal end. This ensures that the liner tube 26 is heated from the distal (closed) end toward the proximal (open) end.

As the heated fluid fills the lumen of the liner tube from the distal end, the air under pressure used to invert the liner tube is permitted to escape through the drainage port 18 and back towards the manifold 30 via the drainage line 18a. The gauge 38a is monitored as the fluids (air under pressure, steam or hot water) pass therethrough. When the gauge shows that the temperatures of the drainage fluids are substantially equal to the temperature of the heated fluid entering the system, this indicates that the heated fluid has reached the proximal end of the liner tube 26. It can now be assumed that the liner tube 16 is substantially filled with said heated fluid. The heat valve 32a and the drainage valve 38a can then be closed, fully or partially, so that the liner tube 26 is not over-pressurized. The resin cures within a significantly abbreviated time because the heat of the heated fluid is conducted by the inflatable bladder (or plastic liner layer 26c) into the resin-impregnated layer 26b, where it acts as a catalyst.

When the resin has sufficiently cured, the drainage valve 36a is opened to allow the lumen of the liner tube to be emptied of the added fluid. To facilitate drainage, the air valve 34a is opened, forcing air under pressure through the perforations 19 in the distal end of the curing tube 16a. This air under pressure forces any remaining heated fluid through the drainage port 18, through the line 18a and into the drainage inlet 38a. The inversion head 20 and curing cap 10 can be removed once substantially all heated fluids are removed from the lumen of the liner tube 26.

Figure 6A:
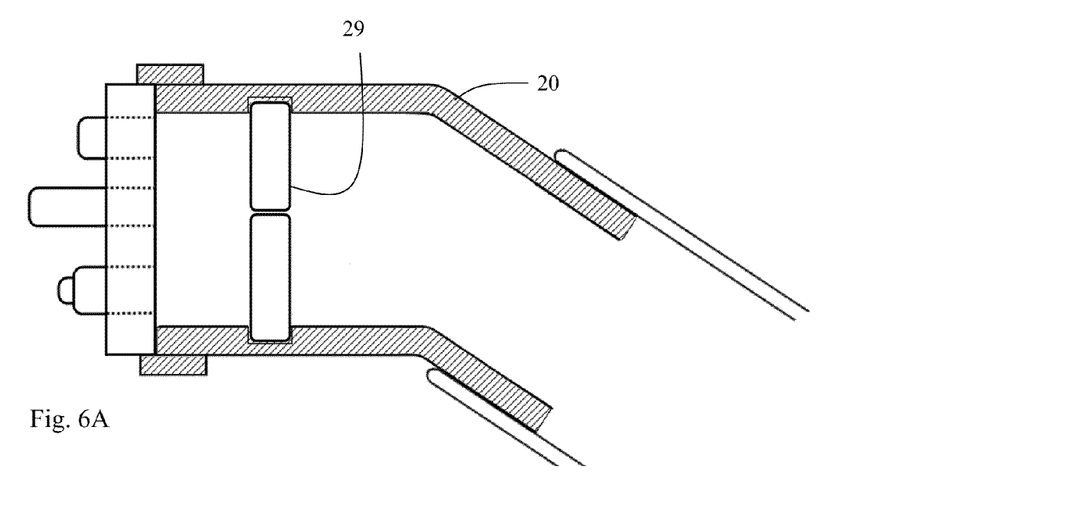
FIG. 6A is a diagrammatic view of an alternative inversion head.

According to an aspect of the invention shown generally in FIG. 6A, the inversion head 20 can be adapted with an inflatable internal plug 29 disposed interiorly and connected to a source of pressurized fluid (preferably air). The plug 29 can be positioned within the inversion head 20 and can also be attached to a portion of the inversion head 20. After the liner tube 26 has been inverted and pressurized, the plug 29 is inflated, thereby forming a substantially airtight seal at the open end of the liner. Once the plug 29 is inflated, it is possible to remove the inversion head 20 from the liner-dispensing unit without maintaining pressure within the liner tube 26. The curing cap 10 (or other cap) can then be attached to the inversion head 20, as described above.

Figure 6B:
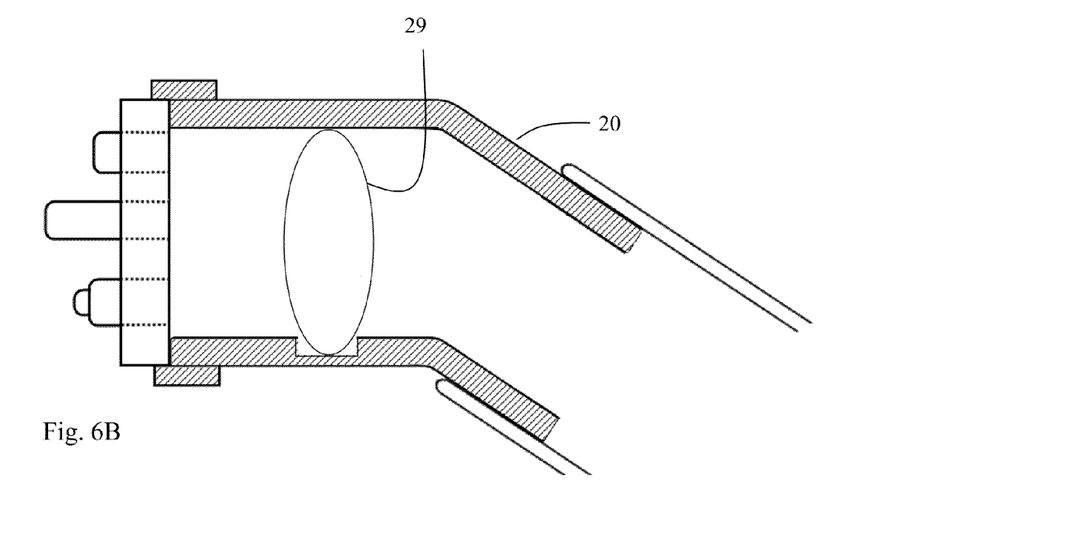
FIG. 6B is a diagrammatic view of an alternative inversion head.

The plug 29 can be recessed within a groove in the interior wall of the inversion head 29. This arrangement permits the liner tube 26 to travel smoothly through the inversion head as it is inverted. The plug 29 can be annular, but can be inflated to occlude the interior of inversion head 20, not unlike a balloon (FIG. 6B).

Alternatively, the plug 29 can be any mechanical means of occluding the interior of the inversion head 20 to provide a substantially airtight seal. Examples include an iris-like device, a ball valve, a check valve, a pipe interrupter, or the like.

Figure 7:
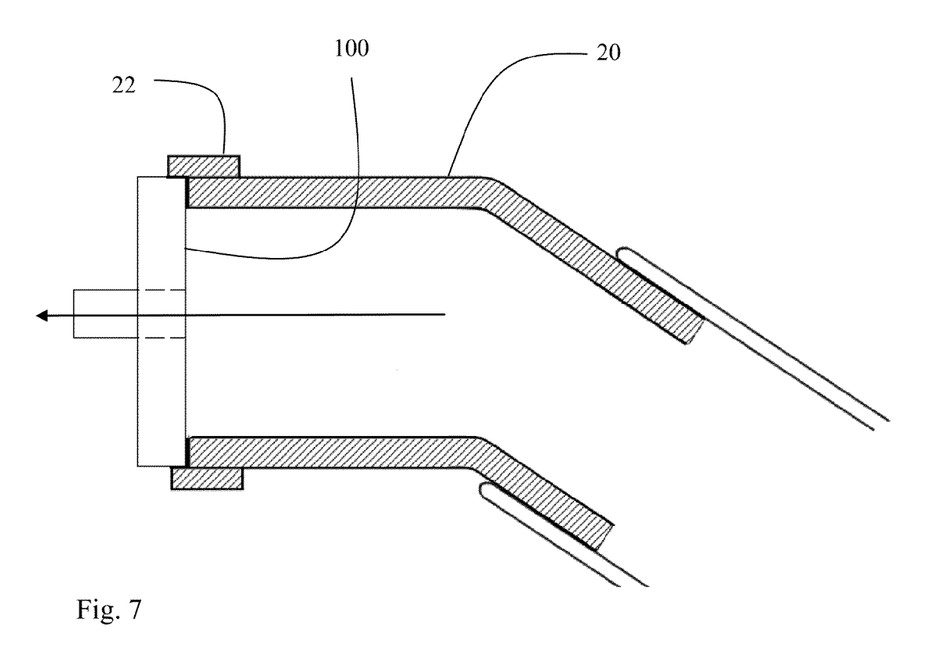
FIG. 7 is a diagrammatic view of a vacuum head installed in the intake of an inversion head.

Prior to use, the curable resin material is applied to the liner tube 26 during a "wetting out" process. The liner tube 26 is attached to the inversion head 20, with the felt or resin-absorbent layer on the interior. Resin is then poured into the opposite end of the liner tube 26. A roller is used over the liner to ensure that the resin is spread evenly along the length of the liner tube 26. An aspect of the invention improves on this method by the use of a vacuum head 100 attached to the inversion head 20, as is shown in FIG. 7. The vacuum head 100 can be attached at the intake 22 of the inversion head.

During the wetting or wetting out process, the vacuum head 100 is attached to the intake 22 of the inversion head 20. After the resin is poured into the liner tube 26 and after or while the roller is rolled over the liner, negative (vacuum) pressure is provided to the interior of the liner tube 26 via the vacuum head 100. The negative or vacuum pressure can be provided by a vacuum source (not shown). This can be any negative pressure source, such as a vacuum or the like. The addition of the vacuum source and pressure helps ensure the even spreading of the resin throughout the liner tube 26. Vacuum (negative) pressure can be used with or without the use of a roller, as well. Once the liner tube 26 is impregnated or saturated with resin, the vacuum head 100 can be removed from the intake 22 of the inversion head 20, and the fluid source and/or curing head can be attached, as described above.

All documents cited herein are incorporated herein by reference in their entirety. The invention is illustrated by the preceding embodiments. These embodiments are provided to aid in the understanding of the invention and are not to be construed as a limitation with regard to the arrangement of the parts shown in the figures or the order of steps provided.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

The foregoing description has been presented for purposes of illustration and description, and is not intended to be an exhaustive list or to limit the invention to precise forms disclosed. It is contemplated that other alternative processes obvious to those skilled in the art are considered to be included in the invention. The description is merely examples of embodiments. It is understood that any other modifications, substitutions, and/or additions may be made, which are within the intended spirit and scope of the invention. From the foregoing, it can be seen that the present invention accomplishes at least all of the stated objectives.

What is claimed is:

1. A method of repairing a damaged section of a pipe, comprising:
   providing a liner having an open first end and a substantially closed second end;
   impregnating the liner with a material capable of curing and hardening;
   inverting the liner into the pipe with an inversion head, wherein the first end of the liner is attached to a portion of the inversion head;
   inflating the liner using a source of pressurized fluid to create pressure within the liner which presses the liner against the wall of the pipe;
   inflating a plug at least partially within the inversion head to substantially close the open end of the liner at the inversion head and maintain pressure within the liner;
   wherein the liner is inverted through the inversion head prior to the inflation of the plug; and
   allowing the material to cure and harden.

2. The method of claim 1 wherein the liner comprises a first layer of felt and a second layer comprising an impervious material.

3. The method of claim 2 wherein the liner is inverted from a position wherein the layer of felt is on the inside to a position wherein the impervious layer is on the inside as the liner is inverted through the inversion head.

4. The method of claim 3 wherein the layer of felt is positioned between the impervious material and the pipe after the liner has been inverted into the pipe.

5. The method of claim 1 further comprising attaching a vacuum head to the inversion head to aid in impregnating the liner with the material capable of curing and hardening.

6. The method of claim 5 further comprising removing the vacuum head and attaching a fluid source to invert the liner into the pipe.

7. The method of claim 6 further comprising replacing the fluid source with a curing head to aid in curing the material.

8. The method of claim 7 further comprising providing steam to the lumen of the inflated liner to decrease curing time for the material.

9. The method of claim 8 wherein the vacuum head, fluid source, and curing head are selectively attached to an intake of the inversion head.

10. The method of claim 1 further comprising providing a bladder that is positionable from a configuration wherein the bladder is at the outside of the liner to a position wherein the bladder is at least partially at the interior of the liner within the pipe.

11. The method of claim 10 further comprising inflating the bladder to press the liner against the wall of the pipe.

12. The method of claim 1 further comprising the step of removing the source of pressurized fluid after the plug is inflated.

13. An assembly for repairing a damaged section of a pipe, comprising:
 an inversion head having an intake end and an opposite discharge end;
 a liner having an open first end and a substantially closed second end, the first end attached to the discharge end of the inversion head;
 a plug positioned at least partially within the inversion head and configured to be inflated to substantially close off the open first end of the liner;
 wherein the intake end of the inversion head configured to removably attach to an inversion member for inflating the liner, and a curing head for curing a material capable of curing and hardening that is impregnated in the liner; and
 wherein the liner is inverted through the inversion head and the plug to be positioned within the damaged section of pipe.

14. The assembly of claim 13 wherein the plug is an inflatable plug or a mechanical plug.

15. The assembly of claim 13 further comprising a vacuum head, a fluid source, or a curing head attached to the intake end of the inversion head.

16. The assembly of claim 13 further comprising a bladder operatively connected to the liner such that the bladder and liner are inverted from a position wherein the liner is substantially within the bladder to a position wherein the liner substantially surrounds the bladder.

17. The assembly of claim 13 wherein the liner is impregnated with a material capable of curing and hardening.

18. The assembly of claim 13 further comprising a curing head operatively connected to the inversion head and comprising:
 a substantially circular body having a first side and a second side;
 an inflation port;
 a curing port;
 a substantially flexible tube, having a first end and a second end, slidably extending through the curing port; and
 a drainage port.

19. A method of repairing a damaged section of a pipe, comprising:
 providing a liner having an open first end and a substantially closed second end;
 attaching the open end of the liner to a discharge end of an inversion head;
 impregnating the liner with a material capable of curing and hardening by applying vacuum pressure at an intake end of the inversion head;
 inverting the liner into the pipe by a fluid source attached to the intake end of the inversion head;
 inflating the liner using a source of pressurized fluid to create pressure within the liner which press the liner against the wall of the pipe;
 inflating a plug at least partially within the inversion head to substantially close the open end of the liner at the inversion head and maintain pressure within the liner;
 wherein the liner is inverted through the inversion head prior to the inflation of the plug; and
 allowing the material to cure and harden.

20. The method of claim 19 further comprising curing the material impregnated in the liner by attaching a curing head to the inversion head and inserting steam to the lumen of the liner.

21. The method of claim 19 wherein the liner comprises a first layer of felt and a second layer comprising an impervious material, and wherein the liner is inverted from a position wherein the layer of felt is on the inside to a position wherein the impervious layer is on the inside as the liner is inverted through the inversion head.

22. The method of claim 19 further comprising the step of removing the source of pressurized fluid after the plug is inflated.

* * * * *